（12) United States Patent
Lee et al.

(10) Patent No.: US 8,646,355 B2
(45) Date of Patent: Feb. 11, 2014

(54) AUTOMOBILE CABLE SOCKET

(75) Inventors: Ho Chul Lee, Incheon (KR); In Seob Ju, Incheon (KR); Jin Seok Yun, Incheon (KR); Jung Jo Lim, Incheon (KR)

(73) Assignee: Daedong System Co., Ltd., Incheon (KR)

( * ) Notice: Subject to any disclaimer, the term of this patent is extended or adjusted under 35 U.S.C. 154(b) by 131 days.

(21) Appl. No.: 13/116,935

(22) Filed: May 26, 2011

(65) Prior Publication Data

US 2011/0294332 A1  Dec. 1, 2011

(30) Foreign Application Priority Data

May 28, 2010 (KR) .......................... 10-2010-0050098
Aug. 12, 2010 (KR) .......................... 10-2010-0077717
Apr. 5, 2011 (KR) .......................... 10-2011-0031001
Apr. 5, 2011 (KR) .......................... 20-2011-0002852

(51) Int. Cl.
*F16C 1/10* (2006.01)
(52) U.S. Cl.
USPC ........................................ 74/502.4

(58) Field of Classification Search
USPC .............................................. 74/502.4, 502.6
See application file for complete search history.

(56) References Cited

U.S. PATENT DOCUMENTS

| 4,917,418 | A | * | 4/1990 | Gokee ........................... 292/125 |
| 5,655,415 | A | * | 8/1997 | Nagle et al. .................. 74/502.6 |
| 5,664,462 | A | * | 9/1997 | Reasoner ....................... 74/502.4 |
| 7,469,617 | B2 | * | 12/2008 | Basile et al. ............. 74/501.5 R |

* cited by examiner

*Primary Examiner* — Vicky Johnson
(74) *Attorney, Agent, or Firm* — The PL Law Group, PLLC

(57) ABSTRACT

An automobile cable socket. The automobile cable socket including a first socket member that is disposed to surround the first cable and includes a plurality of sawtooth portions formed on an external surface thereof in a direction in which the first cable extends, a second socket member coupled to the first socket member and including an engaging portion, a spring installed outside of the second socket member, and a position fix member that is disposed between the second socket member and the spring, releases engagement between the engaging portion of the second socket member and the plurality of sawtooth portions of the first socket member by pressing the spring, and engages the plurality of sawtooth portions with the engaging portion when the spring is restored to an original position.

14 Claims, 27 Drawing Sheets

AUTOMOBILE CABLE SOCKET

CROSS-REFERENCE TO RELATED PATENT APPLICATION

This application claims benefit to Korean Patent Application Nos. 10-2010-0050098, filed on May 28, 2010, 10-2010-0077717, filed on Aug. 12, 2010, 10-2011-0031001, filed on Apr. 5, 2011 and 20-2011-0002852, filed on Apr. 5, 2011 in the Korean Intellectual Property Office, the disclosures of which are incorporated herein in their entireties by reference.

BACKGROUND OF THE INVENTION

1. Field of the Invention

One or more aspects of the present invention relate to automobile cable sockets, and more particularly, to automobile cable sockets that have a simple structure, have increased efficiencies of coupling and separating operations between components, and have an improved structure so as to stably couple components to each other.

2. Description of the Related Art

An automobile cable socket is used to fix a cable for transferring power between automobile components such as a gearshift and a transmission to a vehicle.

An example of the automobile cable socket is shown in FIG. 1. The automobile cable socket of FIG. 1 is disclosed in U.S. Pat. No. 5,664,462. The automobile cable socket connects a pair of cables to each other and fixes the cables to the vehicle. The automobile cable socket includes a first socket member 18, a second socket member 24, a connection clamp 50, and a stopper 68.

In the automobile cable socket having the above-described structure, when the second socket member 24 is inserted into the first socket member 18, the connection clamp 50 is coupled to the first socket member 18 so that a coupling portion 56 of the connection clamp 50 may be engaged with a sawtooth portion 58 of the second socket member 24, and the stopper 68 is inserted into a slit 66 of the first socket member 18, thereby preventing the second socket member 24 from being separated from the first socket member 18.

However, the above-described automobile cable socket includes the connection clamp 50 and the stopper 68 in order to couple the first socket member 18 and the second socket member 24 to each other. In addition, in order to couple the connection clamp 50 and the first socket member 18 to each other, the connection clamp 50 includes a flange rib 50c and a pair of inserting ribs 50a and 50b having a groove G, and the first socket member 18 includes an inserting flange 54a and a flange 54b. Thus, a structure of the automobile cable socket is not simplified, and time and cost taken to form the automobile cable socket is increased.

When the automobile cable socket is used for a long period of time, the pair of inserting ribs 50a and 50b of the connection clamp 50 are elastically deformable in a radial direction of the first socket member 18, and thus the connection clamp 50 is separated from the first socket member 18 to thus disconnect the pair of cables.

In addition, if it is required to separate the first socket member 18 and the second socket member 24 from each other after the first socket member 18 and the second socket member 24 are coupled to each other, since the connection clamp 50 is separated from the first socket member 18 by using a separator tool, efficiency of a separating operation is reduced in reality, and the connection clamp 50 may be damaged during the separation.

SUMMARY OF THE INVENTION

One or more aspects of the present invention provide automobile cable sockets that have a simple structure, have increased efficiencies of coupling and separating operations between components, and have an improved structure so as to stably couple components to each other.

According to an aspect of the present invention, there is provided an automobile cable socket for connecting first and second cables for transferring power between automobile components to each other, and for fixing the first and second cables to an inner portion of a vehicle, the automobile cable socket including a first socket member that is disposed to surround the first cable and includes a plurality of sawtooth portions formed on an external surface thereof in a direction in which the first cable extends, wherein the first cable is moveably installed in the first socket member; a second socket member coupled to the first socket member and including an engaging portion, wherein the second cable is moveably installed in the second socket member, and the engaging portion is elastically deformable and has a shape corresponding to the plurality of sawtooth portions so as to be engaged with the plurality of sawtooth portions; a spring installed outside of the second socket member; and a position fix member that is disposed between the second socket member and the spring, releases engagement between the engaging portion of the second socket member and the plurality of sawtooth portions of the first socket member by pressing the spring, and engages the plurality of sawtooth portions with the engaging portion when the spring is restored to an original position.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an automobile cable socket will be described with regard to exemplary embodiments of the invention with reference to the attached drawings.

Figure 1:
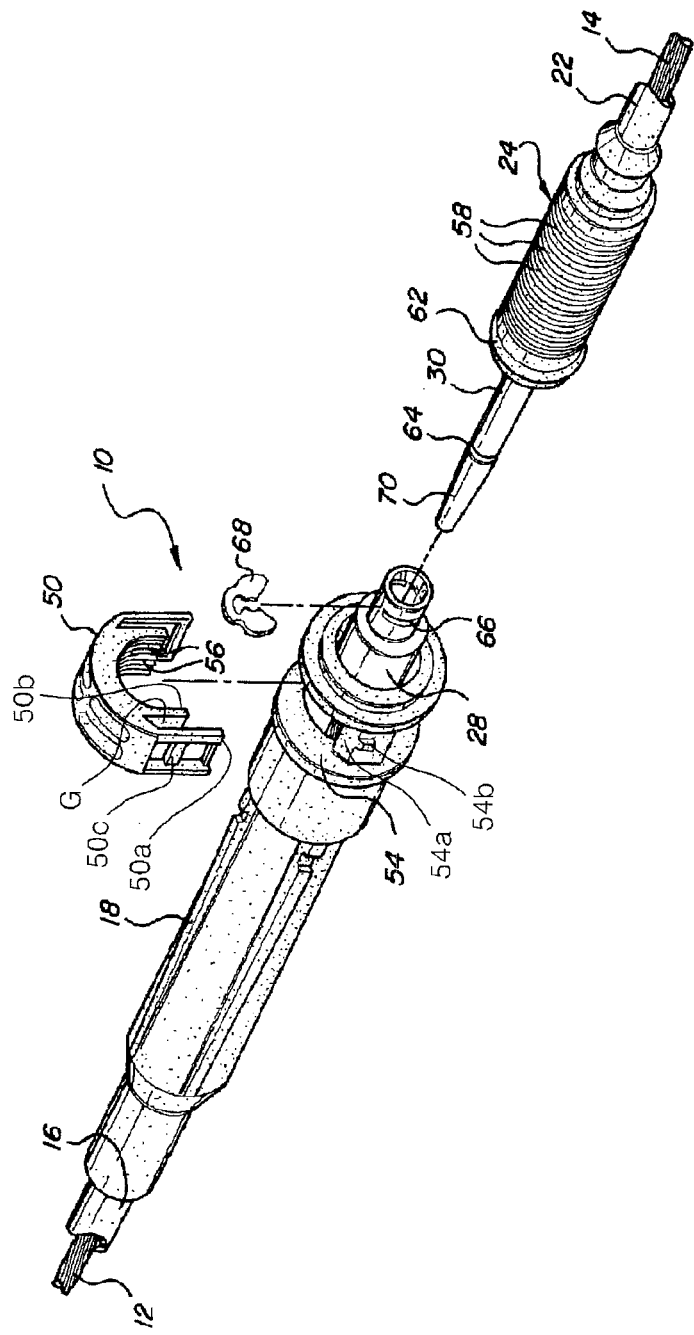
FIG. 1 is an exploded perspective view of a conventional automobile cable socket.
Figure 2:
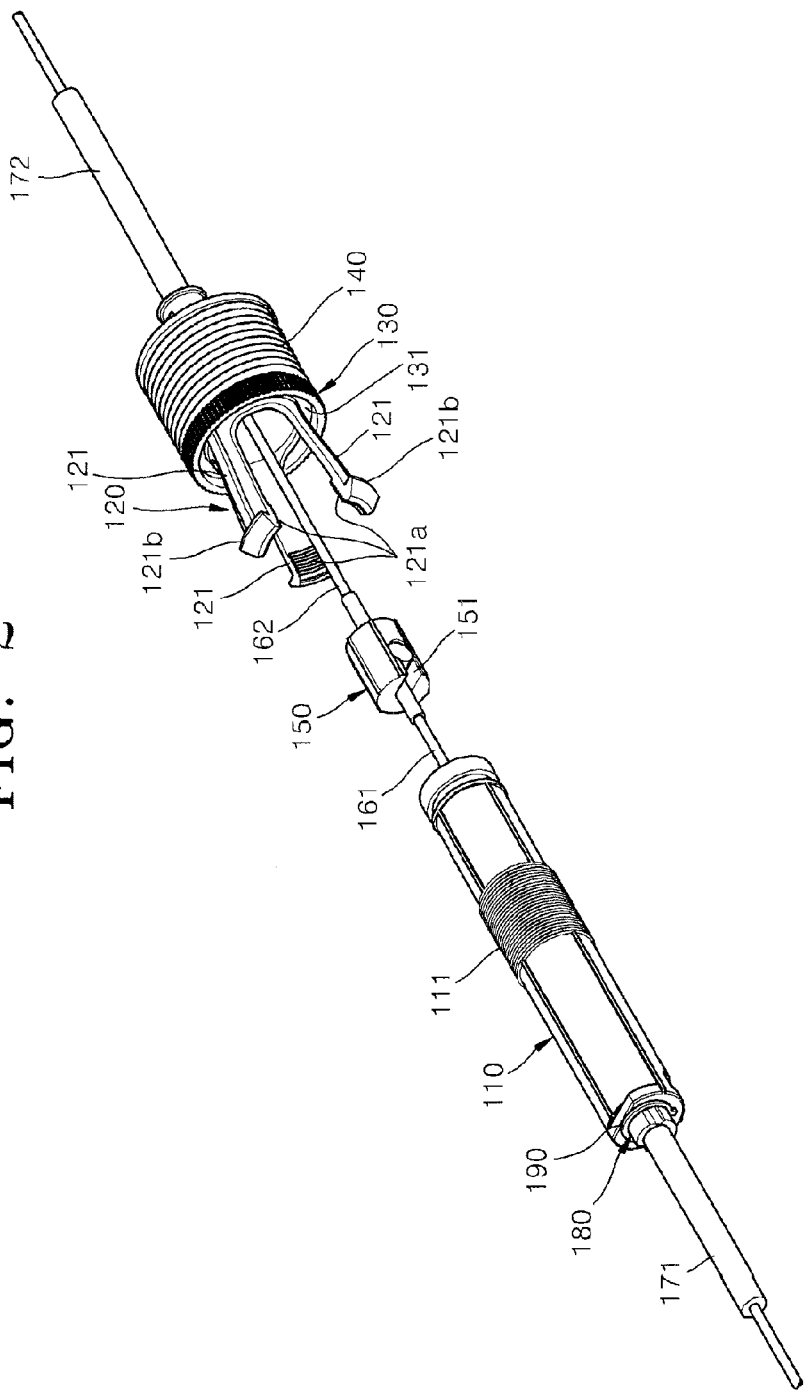
FIG. 2 is an exploded perspective view of an automobile cable socket according to an embodiment of the present invention.
Figure 3:
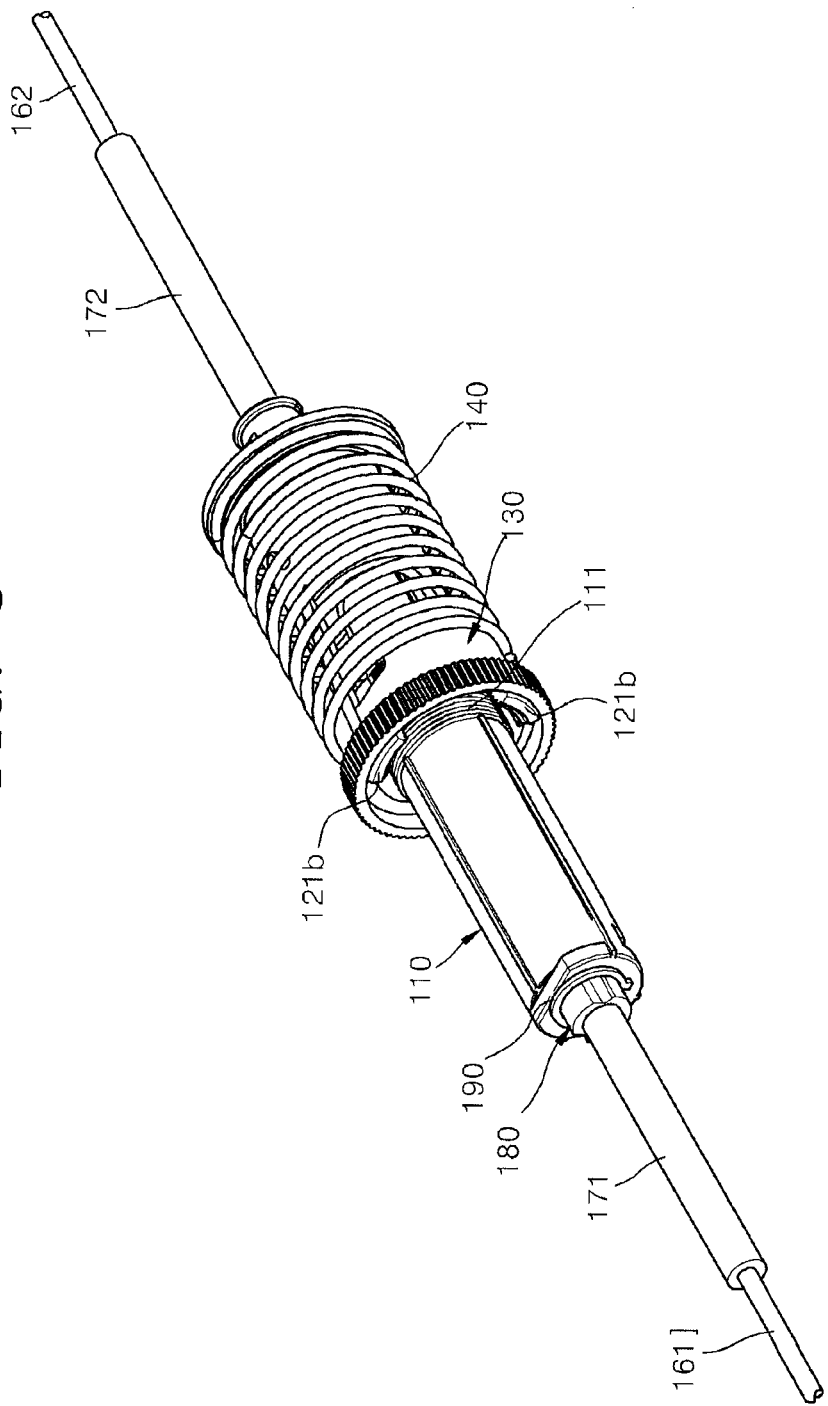
FIG. 3 is a perspective view of the automobile cable socket of FIG. 2 in a state in which the automobile cable socket is assembled.
Figure 4:
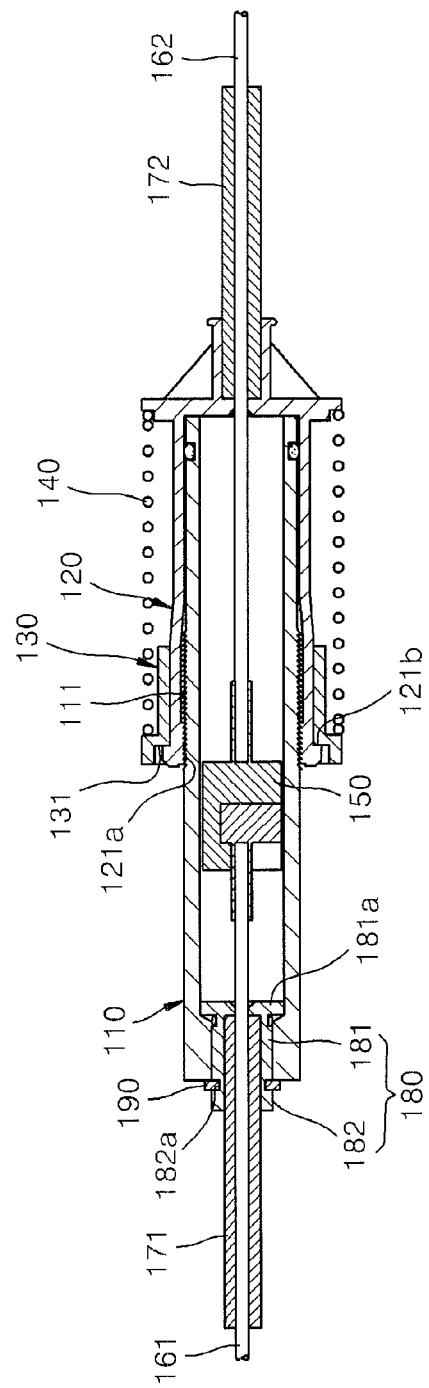
FIG. 4 is a cross-sectional view of the automobile cable socket of FIG. 2.
Figure 5:
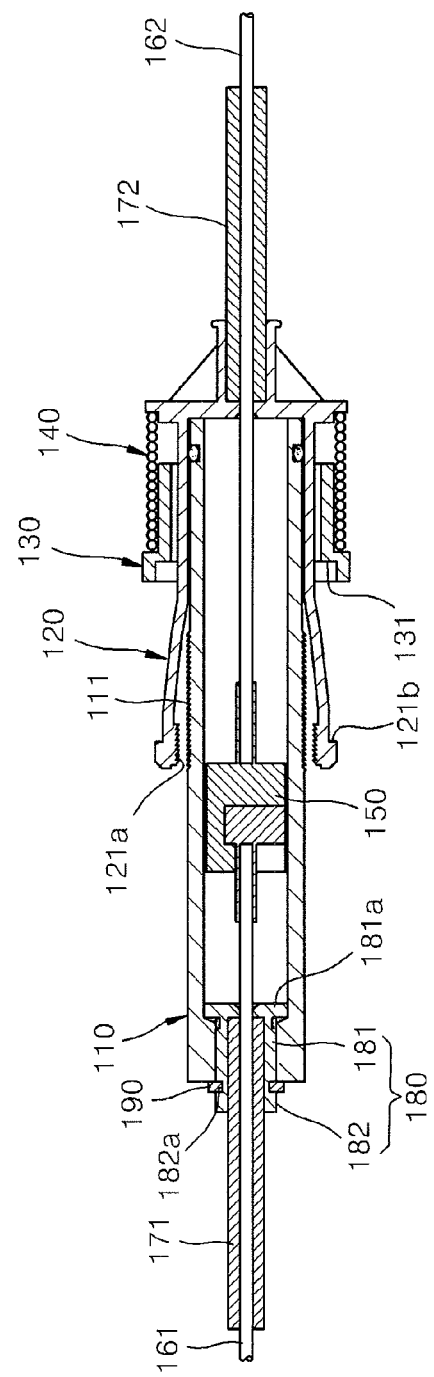
FIG. 5 is a cross-sectional view of the automobile cable socket of FIG. 2 in an operation state.

FIG. 2 is an exploded perspective view of an automobile cable socket according to an embodiment of the present invention. FIG. 3 is a perspective view of the automobile cable socket of FIG. 2 in a state in which the automobile cable socket is assembled. FIG. 4 is a cross-sectional view of the automobile cable socket of FIG. 2. FIG. 5 is a cross-sectional view of the automobile cable socket of FIG. 2 in an operation state.

Referring to FIGS. 2 through 5, the automobile cable socket according to the present embodiment connects cables for transferring power between automobile components such as a gearshift and a transmission to each other and fixes the cables to an inner portion of a vehicle. The automobile cable socket includes a first socket member 110, a second socket member 120, a spring 140, and a position fix member 130.

According to the present embodiment, the cable includes a first cable 161 and a second cable 162. The first cable 161 has a first end coupled to the gearshift and a second end disposed in the first socket member 110. The second cable 162 has a first end coupled to the transmission and a second end that is disposed in the first socket member 110 so as to face the first cable 161.

According to the present embodiment, the automobile cable socket includes a coupling member 150 in order to connect the first cable 161 and the second cable 162 to each other. The coupling member 150 includes an inserting groove 151 to which the first cable 161 is capable of being inserted. That is, when the second cable 162 and the coupling member 150 are coupled to each other, the first cable 161 is connected to the coupling member 150 through the inserting groove 151 so that power may be transferred between the first cable 161 and the second cable 162.

The first socket member 110 is disposed to surround the first cable 161 and the second cable 162. The first cable 161 and the second cable 162 are movably installed in the first socket member 110. A plurality of sawtooth portions 111 are formed on external surfaces of the first socket member 110.

Each of the sawtooth portions 111 is disposed in a direction in which the first cable 161 extends, and is coupled to an engaging portion 121a of the second socket member 120, which will be described later. That is, positions of the first socket member 110 and the second socket member 120 are fixed by coupling the sawtooth portions 111 of the first socket member 110 and the engaging portion 121a of the second socket member 120 to each other.

The first socket member 110 having the above-described structure includes the sawtooth portions 111 formed on an outer circumferential surface thereof in order to couple the first socket member 110 and the second socket member 120 to each other. Thus, the first socket member 110 has a shape symmetrical with respect to a central axis thereof. Accordingly, the first socket member 110 may have a simplified structure, and may have a mold for forming a product, which is easily formed, thereby reducing manufacturing costs.

The second socket member 120 includes elastic legs 121 that are disposed to surround the first socket member 110 and are capable of being elastically deformable. Each of the elastic legs 121 includes the engaging portion 121a that has a shape corresponding to the sawtooth portions 111 and is engaged with the sawtooth portions 111.

The spring 140 is disposed outside of the second socket member 120. The engaging portion 121a of the second socket member 120 may be selectively and elastically deformed by the spring 140. That is, as shown in FIGS. 3 and 4, the engaging portion 121a of the second socket member 120 is pressed by the spring 140 so that positions of the first socket member 110 and the second socket member 120 are fixed. As shown in FIGS. 2 and 5, a pressure applied to the engaging portion 121a is released so that the second socket member 120 may be separated from the first socket member 110.

The position fix member 130 provides a pressure for moving back the spring 140 from a state shown in FIG. 4 to a state shown in FIG. 5, and is disposed between the second socket member 120 and the spring 140.

The position fix member 130 presses the spring 140 so that the engaging portion 121a of the second socket member 120 is released from the sawtooth portions 111 of the first socket member 110, as shown in FIG. 5. When the spring 140 is restored to an original position, the engaging portion 121a and the sawtooth portions 111 are engaged with each other, as shown in FIG. 4.

According to the present embodiment, the automobile cable socket includes a stopper 121b and a stumbling projection 131 so that the position fix member 130 may not be moved by a pressure generated by the spring 140 when the sawtooth portions 111 and the engaging portion 121a are engaged with each other.

The stopper 121b is included in the second socket member 120, and the stumbling projection 131 is included in the position fix member 130. The stumbling projection 131 of the position fix member 130 stumbles over the stopper 121b of the second socket member 120 so as to prevent the position fix member 130 from being separated from the second socket member 120.

The second socket member 120 and the position fix member 130 have shapes symmetrical with an axis direction in which the first and second cables 161 and 162 extend. Thus, components for coupling the first socket member 110 and the second socket member 120 may have a simple structure and may be easily formed. That is, since the first socket member 110, the second socket member 120 and the position fix member 130 may have shapes symmetrical with the axis direction, conventional asymmetrical components are not required. Thus, a mold for forming a product may be easily formed, thereby increasing productivity of the product and reducing manufacturing costs.

According to the present embodiment, the position fix member 130 is pressed to move back the spring 140, and then a pressure applied to the position fix member 130 is released so that the first socket member 110 and the second socket member 120 are coupled to each other. Thus, efficiencies of coupling and separating operations between the first socket member 110 and the second socket member 120 may be increased in reality. In addition, if it is required to separate the first socket member 110 and the second socket member 120 from each other after the first socket member 110 and the second socket member 120 are coupled to each other, the first socket member 110 and the second socket member 120 may be separated from each other without being damaged.

The automobile cable socket according to the present embodiment may include liners 171 and 172 in order to prevent direct friction between the first and second cables 161 and 162, and the first socket member 110 from occurring when the first cable 161 and the second cable 162 relatively move with respect to the first socket member 110.

The liners 171 and 172 are disposed between the first socket member 110 and the first cable 161, and between the second socket member 120 and the second cable 162, respectively. The first and second cables 161 and 162 may be relatively moved in the liners 171 and 172, respectively.

The automobile cable socket according to the present embodiment may include a cap member 180 and a separation blocking member 190 so as to prevent the liner 171 from being separated from the first socket member 110.

The cap member 180 includes a flange portion 181 disposed between the liner 171 and the first socket member 110, and an exposed portion 182 extending from the flange portion 181. The flange portion 181 includes a position fix projection 181a that stumbles over an inner surface of the first socket member 110. The exposed portion 182 includes an inserting groove 182a formed on an external surface thereof, which is exposed to the outside through the first socket member 110 when the cap member 180, and the liners 171 and 172 are coupled to each other.

The separation blocking member 190 prevents the liner 171 and the cap member 180 from moving with respect to the first socket member 110, and is inserted into the inserting groove 182a of the cap member 180.

Since the automobile cable socket according to the present embodiment including the cap member 180 and the separation blocking member 190 includes a position of the liner 171 that supports the first cable 161 so that the first cable 161 may relatively move may be fixed in the first socket member 110, thereby increasing processability when the position of the liner 171 is fixed.

Figure 6:
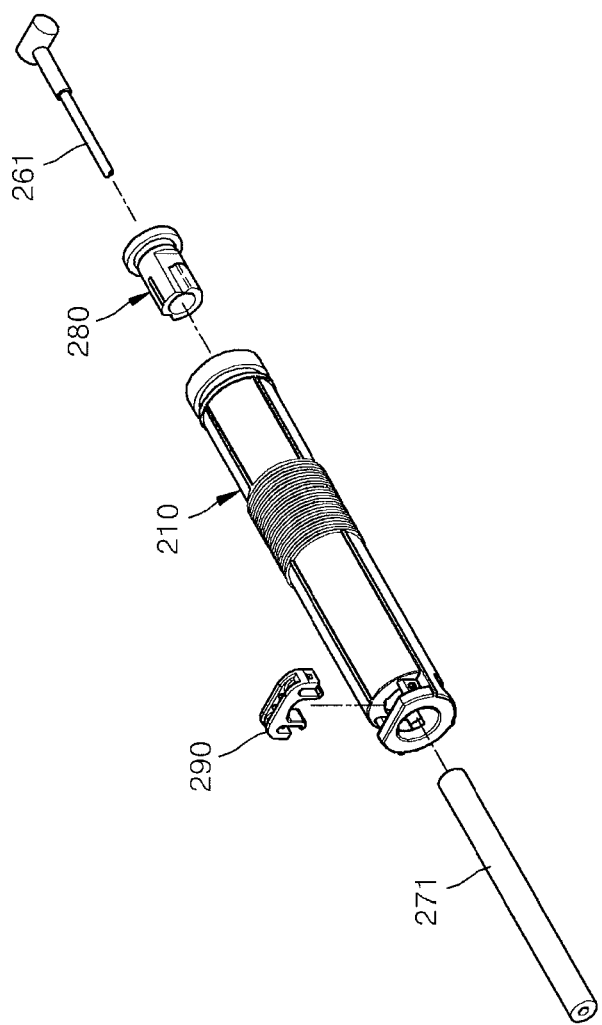
FIG. 6 is an exploded perspective view of a portion of an automobile cable socket according to another embodiment of the present invention.

FIG. 6 is an exploded perspective view of a portion of an automobile cable socket according to another embodiment of the present invention.

The automobile cable socket of FIG. 6 is different from the automobile cable socket of FIG. 2 in terms of the shape of a separation blocking member 290 and a receiving groove formed in a first socket member 210 and for accommodating the separation blocking member 290.

Referring to FIG. 6, the separation blocking member 290 is coupled to a cap member 280 through the first socket member 210, and thus a liner 271 of the cap member 280 is further prevented from being separated from the first socket member 210, compared to in FIG. 2. In this case, a reference numeral 261 is a cable that is moveably installed inside the liner 271.

Figure 7:
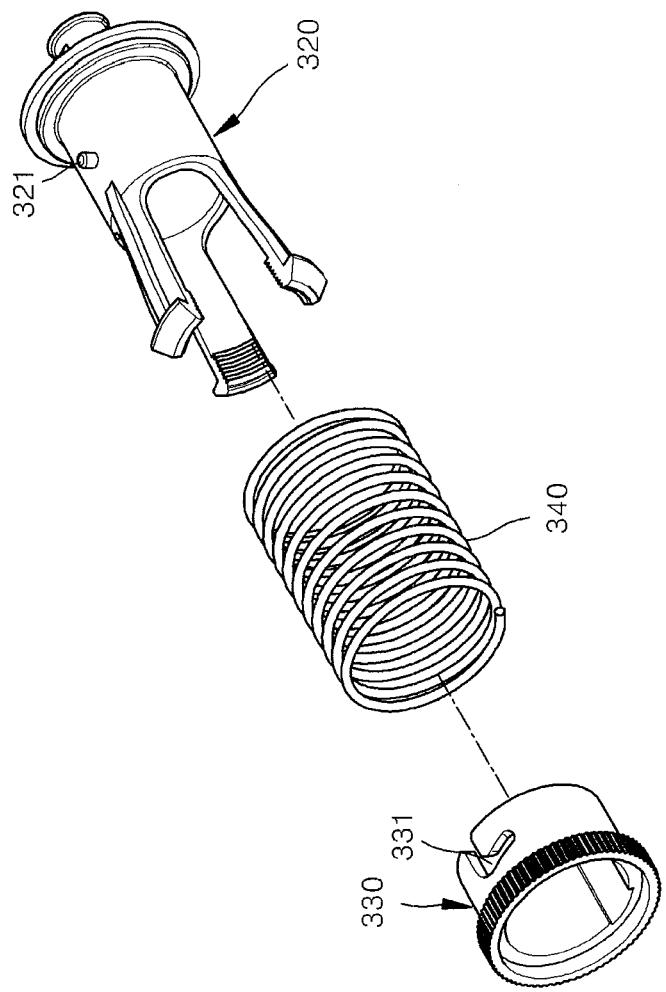
FIG. 7 is an exploded perspective view of a portion of an automobile cable socket according to another embodiment of the present invention.
Figure 8:
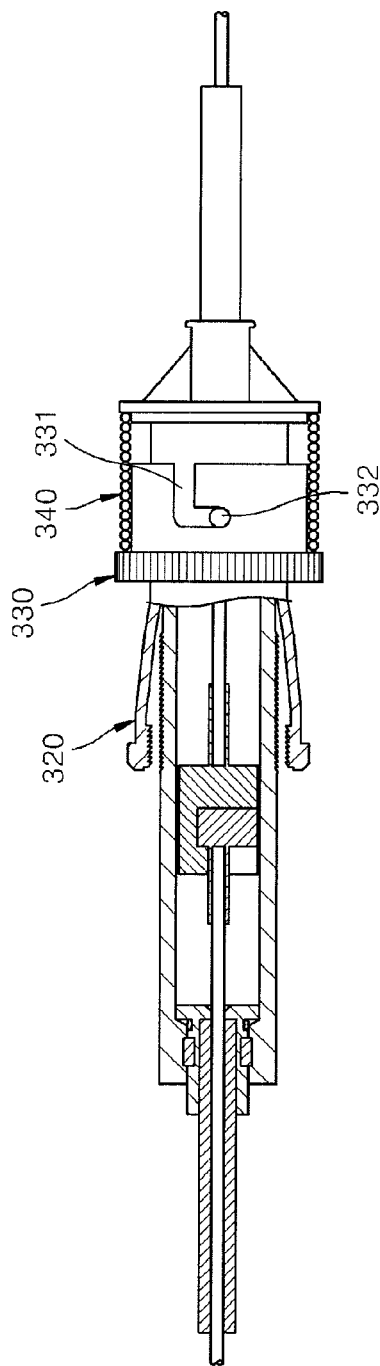
FIG. 8 is a cross-sectional view of the automobile cable socket of FIG. 7.
Figure 9:
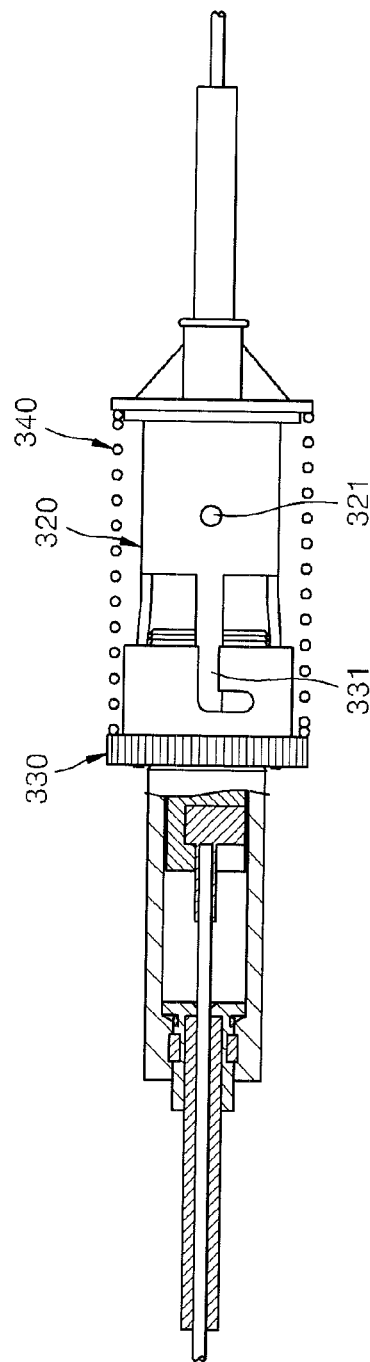
FIG. 9 is a cross-sectional view of the automobile cable socket of FIG. 7 in an operation state.

FIG. 7 is an exploded perspective view of a portion of an automobile cable socket according to another embodiment of the present invention. FIG. 8 is a cross-sectional view of the automobile cable socket of FIG. 7. FIG. 9 is a cross-sectional view of the automobile cable socket of FIG. 7 in an operation state.

Referring to FIGS. 7 through 9, unlike in the above-described embodiments of the present invention, the automobile cable socket according to the present embodiment includes an inserting slit 331 formed in a position fix member 330 and a position fix boss 321 formed in a second socket member 320.

According to the present embodiment, when the position fix member 330 moves back while pressing a spring 340, the position fix boss 321 is inserted into the inserting slit 331 as to maintain an elastic deformation state of an engaging portion of the second socket member 320. As shown in FIG. 9, if a user wants to assemble or disassemble the automobile cable socket, the user does not have to continually hold the position fix member 330, thereby the user's convenience.

Hereinafter, an automobile cable socket according to another embodiment of the present invention will be described in detail with reference to FIGS. 10 through 14.

Figure 10:
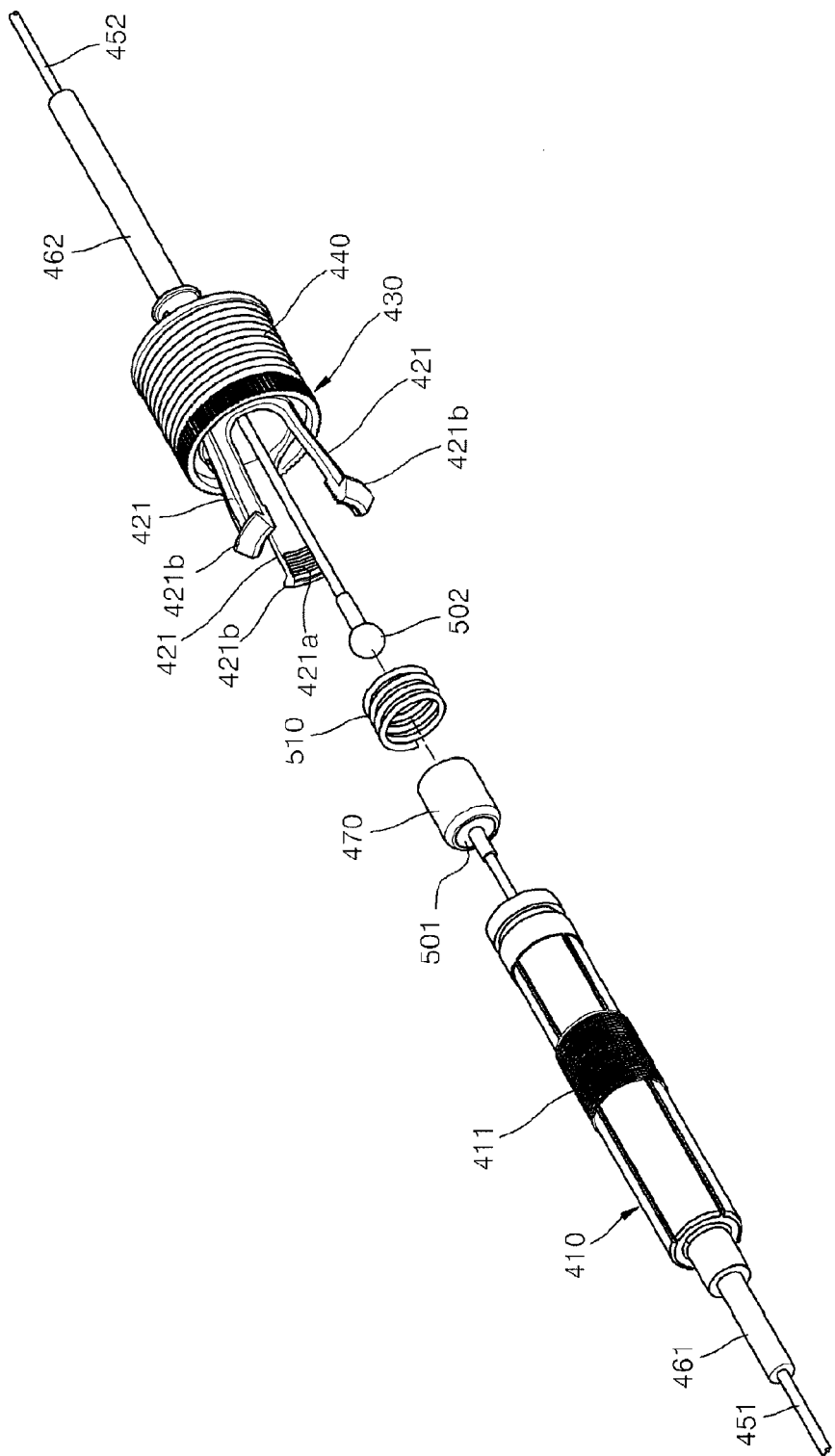
FIG. 10 is an exploded perspective view of an automobile cable socket according to another embodiment of the present invention.
Figure 11:
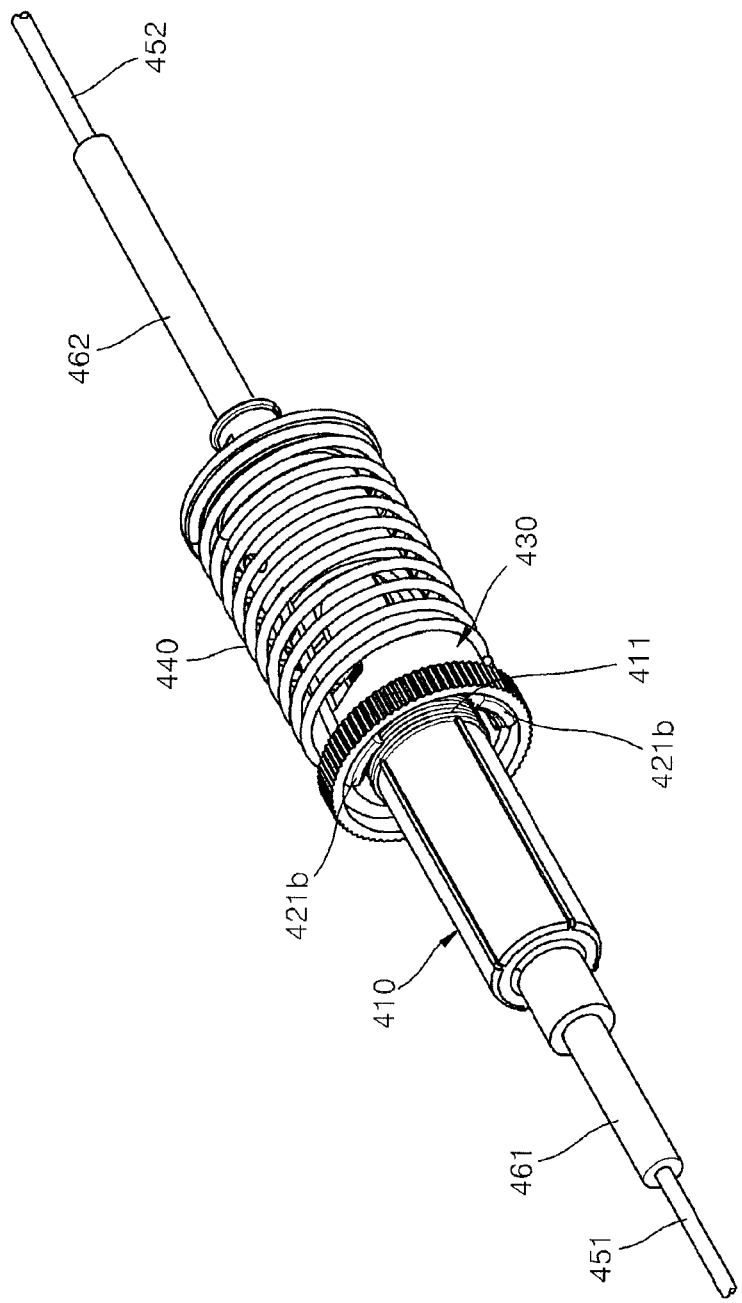
FIG. 11 is a perspective view of the automobile cable socket of FIG. 10 in a state in which the automobile cable socket is assembled.
Figure 12:
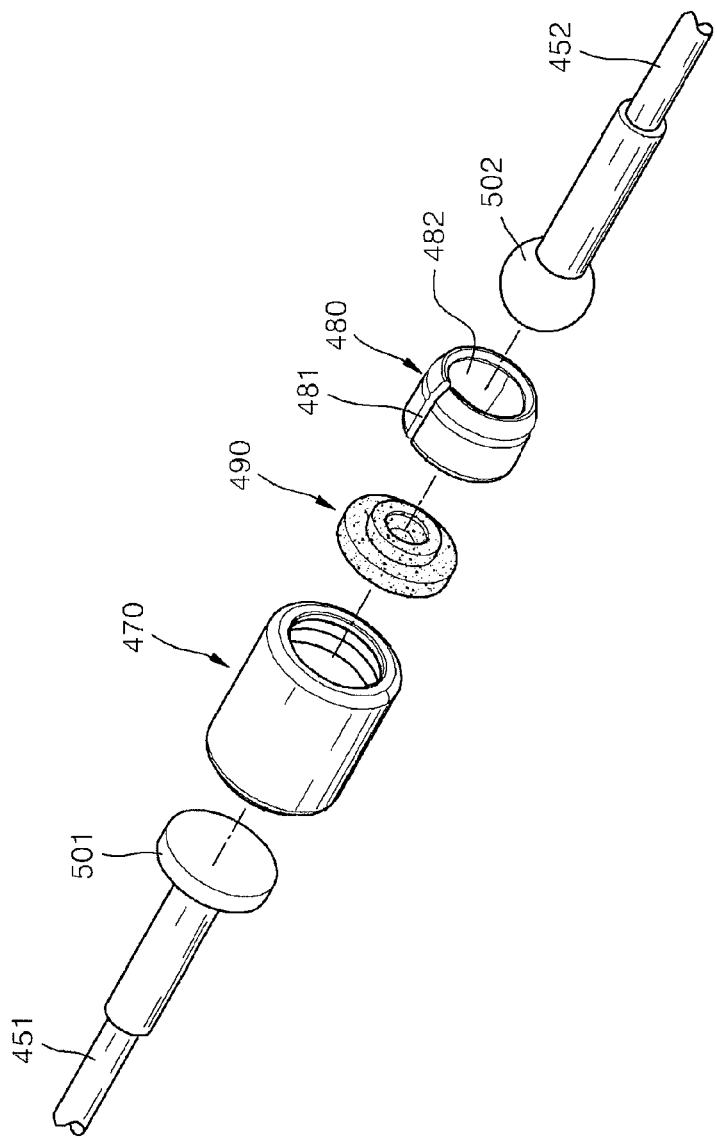
FIG. 12 is an exploded perspective view of a connection unit for connecting cables to each other in the automobile cable socket of FIG. 10.
Figure 13A:
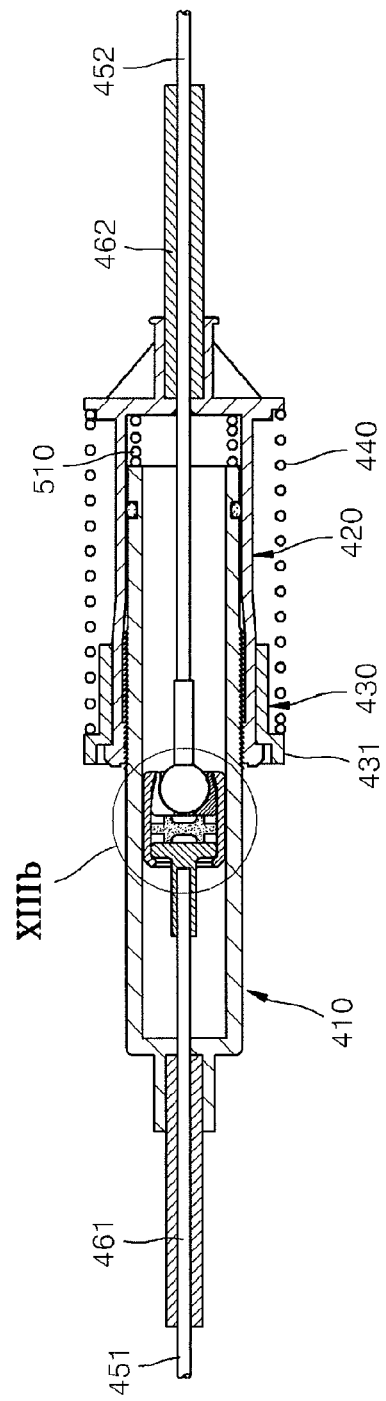
FIG. 13A is a cross-sectional view of the automobile cable socket of FIG. 10.
Figure 13B:
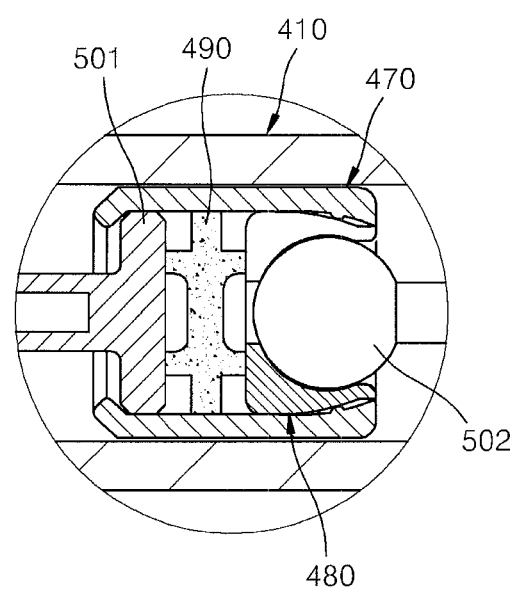
FIG. 13B is a cross-sectional view of a magnified portion of a portion XIIIb of FIG. 13A.
Figure 14:
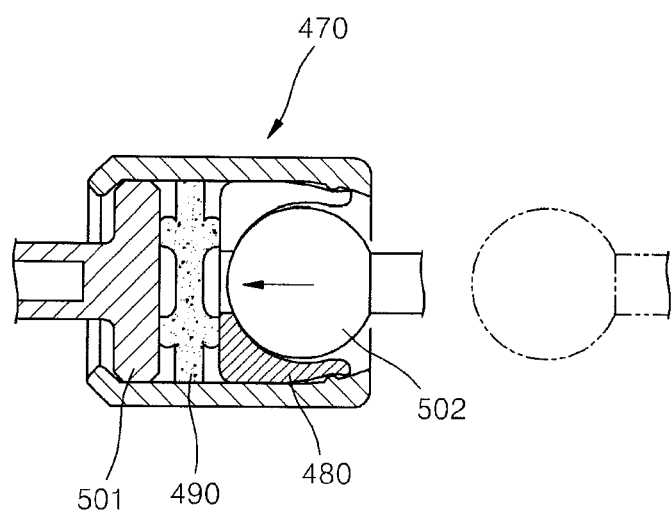
FIG. 14 is a cross-sectional view for showing an operation state of connecting cables in the automobile cable socket of FIG. 10.

FIG. 10 is an exploded perspective view of an automobile cable socket according to another embodiment of the present invention. FIG. 11 is a perspective view of the automobile cable socket of FIG. 10 in a state in which the automobile cable socket is assembled. FIG. 12 is an exploded perspective view of a connection unit for connecting cables to each other in the automobile cable socket of FIG. 10. FIG. 13A is a cross-sectional view of the automobile cable socket of FIG. 10. FIG. 13B is a cross-sectional view of a magnified portion of a portion XIIIb of FIG. 13A. FIG. 14 is a cross-sectional view for showing an operation state of connecting cables in the automobile cable socket of FIG. 10.

Referring to FIGS. 10 through 14, the automobile cable socket according to the present embodiment connects a first cable 451 and a second cable 452, for transferring power between automobile components, to each other, and includes a first socket member 410, a second socket member 420, a coupling member 470, a bush 480, and a vibration blocking member 490. The second socket member 420, the elastic legs 421, the stopper 421b, the engaging portion 421a, the saw-tooth portion 411, the position fix member 430, the spring 440, the first and second liners 461, 462, and the spring 510 illustrated in FIGS. 10 through 14 have the same structure and perform the same functions as those illustrated in FIGS. 2 through 9 and thus detailed descriptions thereof will be omitted.

Configuration for coupling the first socket member 410 and the second socket member 420 to each other has been described above. Thus, hereinafter a connection unit for connecting the first cable 451 and the second cable 452 to each other will be described.

As shown in FIGS. 12 through 14, the connection unit according to the present embodiment includes the coupling member 470, the bush 480, and the vibration blocking member 490.

The coupling member 470 is installed in an internal space, which is formed by coupling the first socket member 410 and the second socket member 420 to each other, so as to move in a longitudinal direction of the first and second cables 451 and 452, and has a receiving space for accommodating the bush 480 and the vibration blocking member 490.

That is, the bush 480 and the vibration blocking member 490 are disposed in the receiving space of the coupling member 470. A first connection member 501 coupled to the first cable 451 and a second connection member 502 coupled to the second cable 452 are disposed in the receiving space of the coupling member 470.

The bush 480 includes an internal space 482 that is capable of being extended or reduced. That is, a slit 481 is formed in a radial direction of the bush 480 so as to be elastically deformable. In addition, the internal space 482 of the bush 480 has a spherical shape. The second connection member 502 is formed to have a spherical shape so as to be inserted into the internal space 482 having a spherical shape.

The vibration blocking member 490 ensures a space so that the bush 480 is prevented from being deformed in a radial direction, and prevents a vibration from being transferred. That is, when the bush 480 is desired to be fixedly installed as shown in FIG. 13, since the internal space 482 of the bush 480 may not be extended, the second connection member 502 may not be inserted into the internal space 482.

In order to overcome this problem and to increase efficiency of connecting the first cable 451 and the second cable 452 to each other, the vibration blocking member 490 may be disposed between the first connection member 501 and the bush 480 in a longitudinal direction of the first and second cables 451 and 452, as shown in FIG. 14.

According to the present embodiment, when the first connection member 501 to which the first cable 451 is connected, the bush 480, and the vibration blocking member 490 are disposed inside the coupling member 470, the second connection member 502 to which the second cable 452 is connected is pressed towards the internal space 482 of the bush 480, as shown in FIG. 14, so that the first cable 451 and the second cable 452 are connected to each other from a power point of view, thereby increasing processability when cables for transferring power between automobile components.

Hereinafter, an automobile cable socket according to another embodiment of the present invention will be described in detail with reference to FIGS. 15 through 19.

Figure 15:
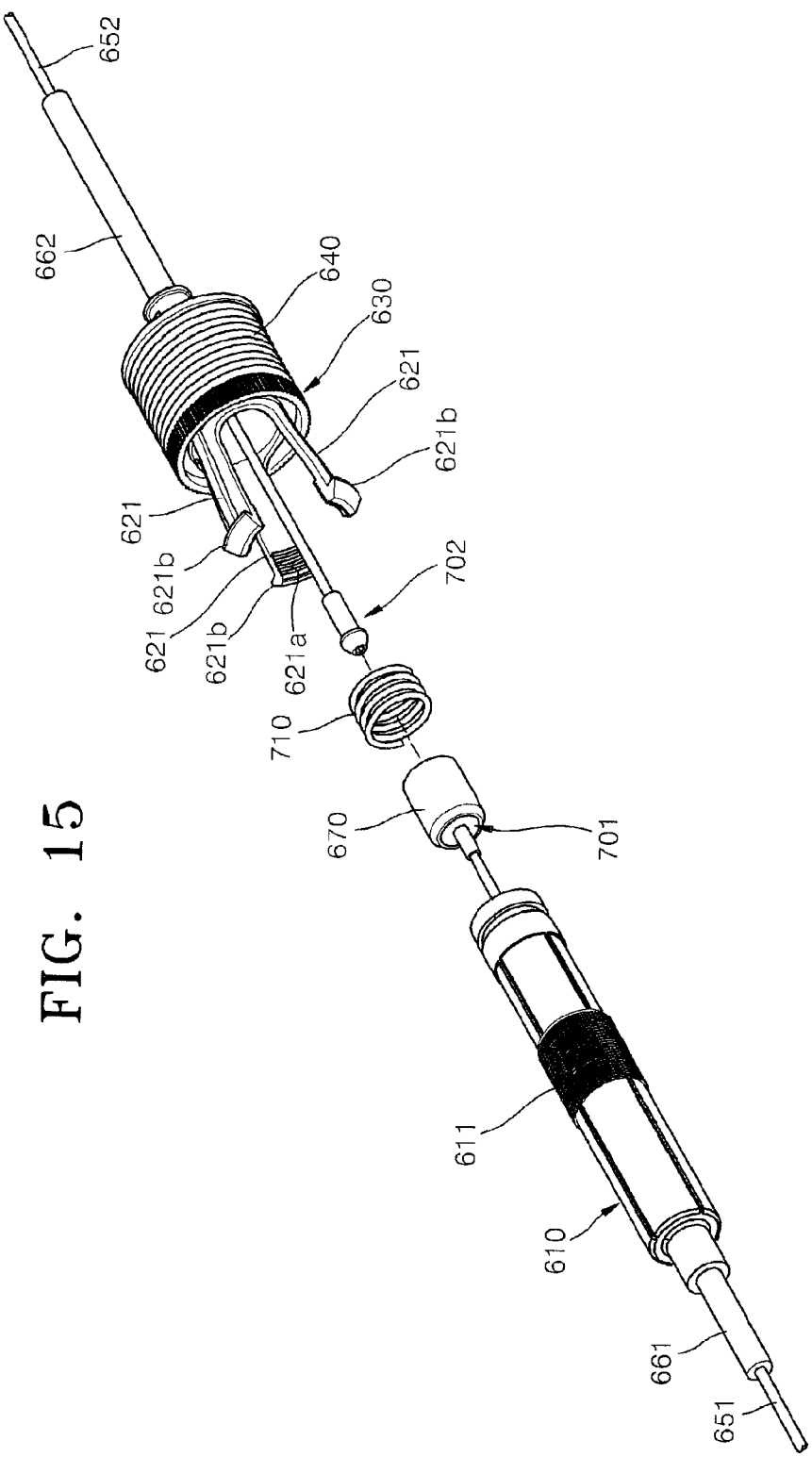
FIG. 15 is an exploded perspective view of an automobile cable socket according to another embodiment of the present invention.
Figure 16:
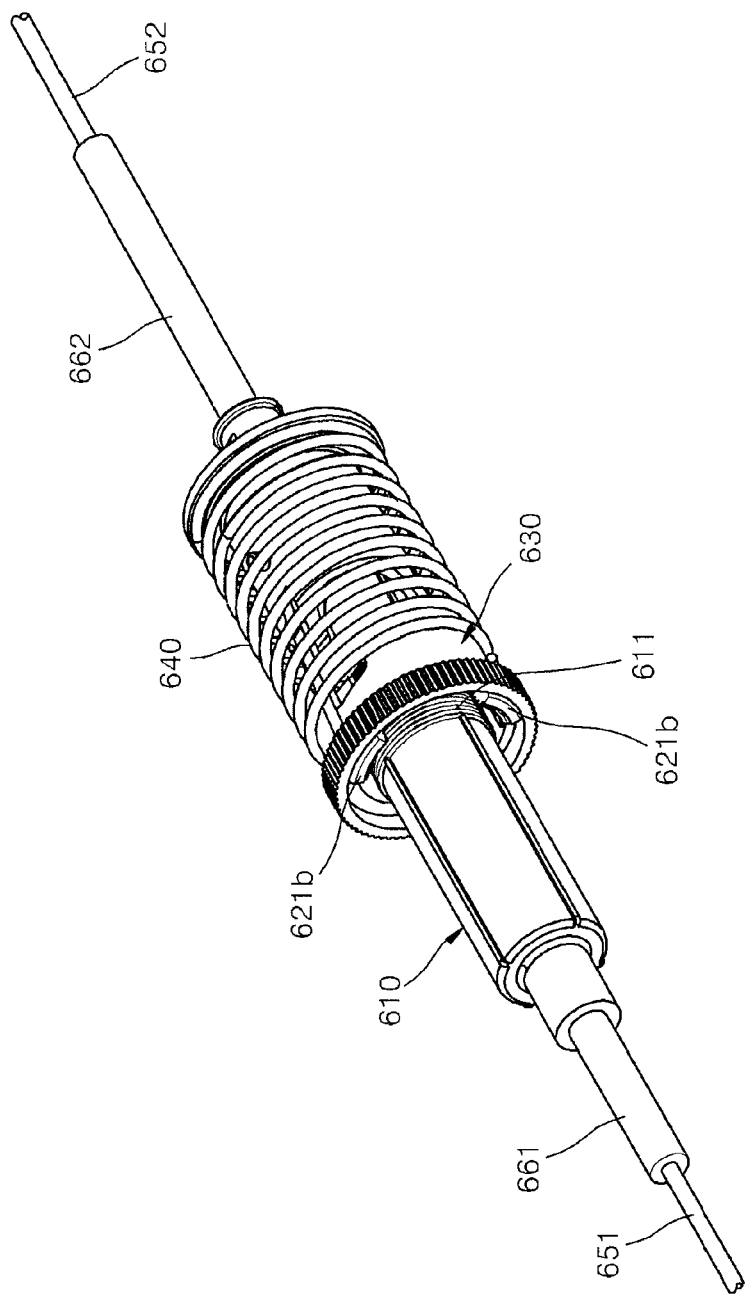
FIG. 16 is a perspective view of the automobile cable socket of FIG. 15 in a state in which the automobile cable socket is assembled.
Figure 17:
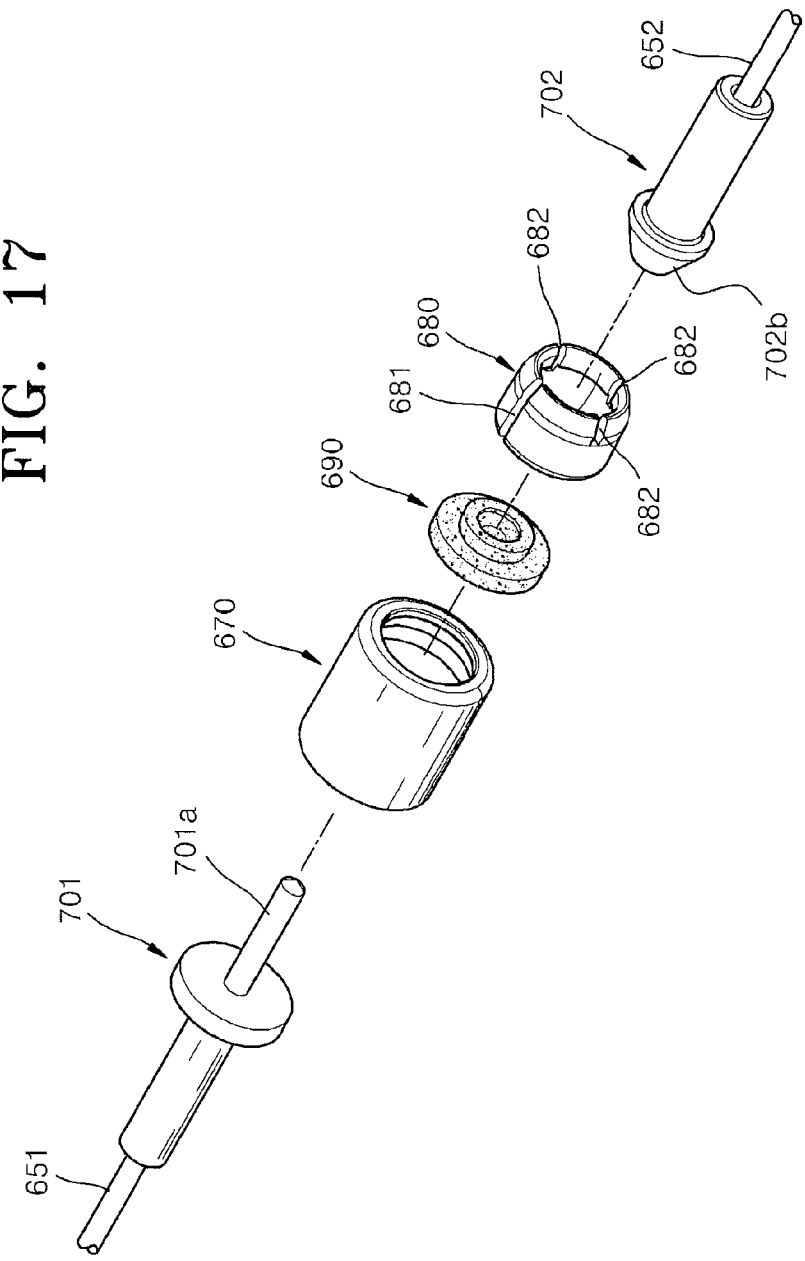
FIG. 17 is an exploded perspective view of a main portion of the automobile cable socket of FIG. 15.
Figure 18:
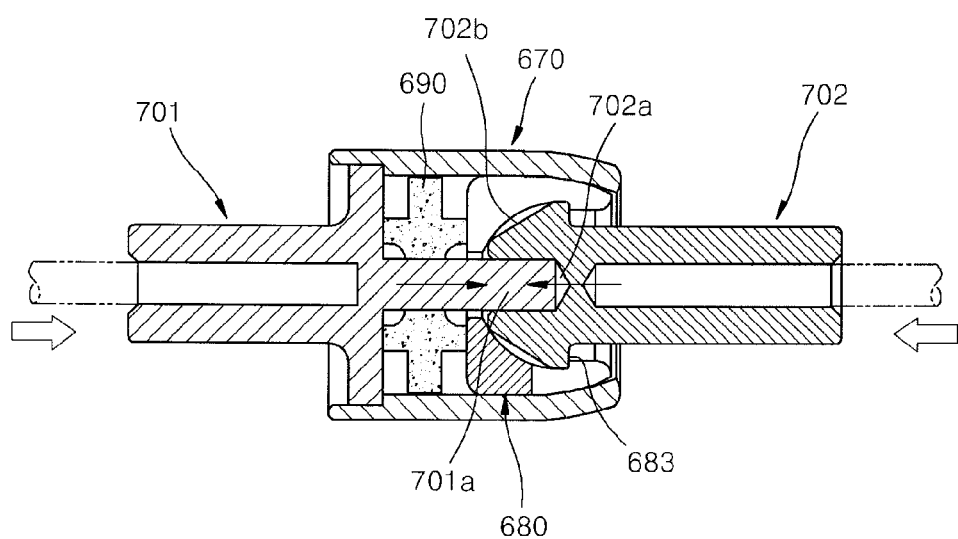
FIG. 18 is a cross-sectional view of a main portion of the automobile cable socket of FIG. 15.
Figure 19A:
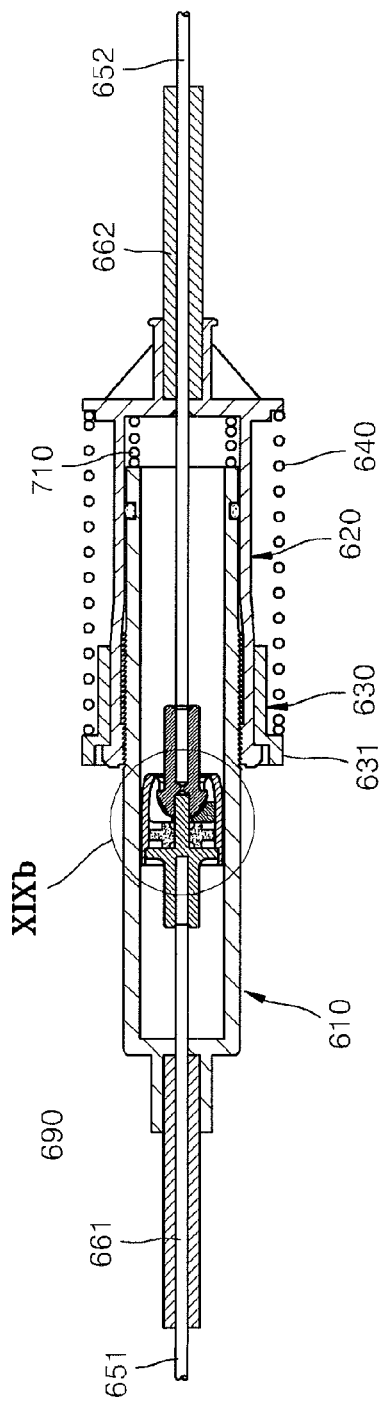
FIG. 19A is a cross-sectional view of the automobile cable socket of FIG. 15.
Figure 19B:
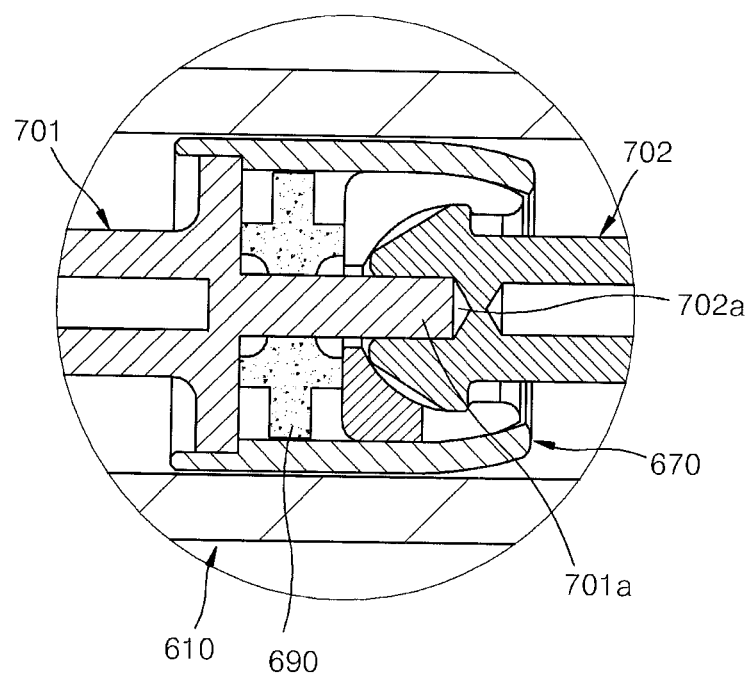
FIG. 19B is a cross-sectional view of a magnified portion of a portion XIXb of FIG. 19A.

FIG. 15 is an exploded perspective view of an automobile cable socket according to another embodiment of the present invention. FIG. 16 is a perspective view of the automobile cable socket of FIG. 15 in a state in which the automobile cable socket is assembled. FIG. 17 is an exploded perspective view of a main portion of the automobile cable socket of FIG. 15. FIG. 18 is a cross-sectional view of a main portion of the automobile cable socket of FIG. 15. FIG. 19A is a cross-sectional view of the automobile cable socket of FIG. 15. FIG. 19B is a cross-sectional view of a magnified portion of a portion XIXb of FIG. 19A.

Referring to FIGS. 15 through 19B, the automobile cable socket according to the present embodiment includes a first connection member 701, a second connection member 702, and a coupling member 670.

The first connection member 701 includes a coaxial maintenance boss 701a to which a first cable 651 of a pair of cables 651 and 652 for transferring power between automobile components. The coaxial maintenance boss 701a protrudes in a direction in which the first cable 651 extends.

A second cable 652 facing the first cable 651 is connected to the second connection member 702. The second connection member 702 is disposed to face the first connection member 701, and includes a coaxial maintenance groove 702a for coaxially accommodating the coaxial maintanance boss 701a.

According to the present embodiment, a vibration blocking member 690 is disposed between ends of the first connection member 701 and the second connection member 702. The coaxial maintanance boss 701a of the first connection member 701 is coupled to a coaxial maintenance groove 702a of the second connection member 702 through the vibration blocking member 690. That is, the first connection member 701 and the second connection member 702 are disposed at opposite sides so that the vibration blocking member 690 is disposed between the first connection member 701 and the second connection member 702.

According to the present embodiment, the vibration blocking member 690 formed of elastic rubber is disposed between the first connection member 701 and the second connection member 702 in order to increase performance for blocking a vibration. The present embodiment is characterized in that the coaxial maintanance boss 701a of the first connection member 701 is inserted into a coaxial maintenance groove 702a of the second connection member 702, thereby preventing the first connection member 701 from tilting with respect to the second connection member 702 or the first cable 651 from bending with respect to the second cable 652, or the second connection member 702 from tilting the first connection member 701 or the second cable 652 from bending with respect to the first cable 651. Accordingly, alternatively, the vibration blocking member 690 may be omitted.

As shown in FIG. 18, the coupling member 670 couples and seals ends of the first connection member 701 and the second connection member 702, which face each other, together with the vibration blocking member 690.

As shown in FIGS. 19A and 19B, since the first connection member 701 and the second connection member 702 are disposed inside socket members, when a force for transferring power is applied to the socket members, tilting between connection members or bending between cables may generally occur.

However, according to the present invention, the first connection member 701 and the second connection member 702 are connected to each other so as to coaxially tilt through the coaxial maintanance boss 701a and a coaxial maintenance groove 702a and are connected inside the coupling member 670. Thus, since tilting between the first connection member 701 and the second connection member 702 does not occur, and bending between cables does not occur, the first connection member 701, the second connection member 702, and the coupling member 670 axially and linearly moves only inside the socket members.

Accordingly, the first and second connection members 701 and 702, and the first and second cables 651 and 652 may be prevented from contacting inner surfaces of socket members 610 and 620 to generate friction due to tilting between the first connection member 701 and the second connection member 702 and bending between the first and second cables 651 and 652. Therefore, the durability of a product may be prevented from being reduced due to the friction. In addition, since power may be precisely transferred without friction, performance and sensitivity of the product may be prevented from being reduced after the product is used for a long period of time.

As shown in FIG. 17, a bush 680 for accommodating a front end of the second connection member 702 includes a split slit 681 for elastically deforming the bush 680, and a plurality of worn portions 682 that are arranged in a radial direction together with the split slit 681. The wore portions 682 facilitates the elastic deformation of the bush 680 together with the split slit 681 so that the second connection member 702 may be easily inserted into the bush 680.

As shown in FIG. 18, a separation blocking projection 683 may be formed on an inner circumference surface of the bush 680. The separation blocking projection 683 is a portion that stumbles over a portion of a tapered portion 702b of the second connection member 702, which has a greatest diameter, and prevents the second connection member 702 from being inappropriately separated from the bush 680 after the second connection member 702 is inserted into the bush 680.

According to the present embodiment, the second connection member 702 includes the tapered portion 702b. That is, the tapered portion 702b is configured so that a front end thereof has a smallest diameter and a diameter is gradually increased towards a portion having a constant diameter, and thus the second connection member 702 may be easily inserted into the bush 680.

So far, the main portion of the automobile cable socket has been described with reference to FIGS. 15 through 19. Other components that have not been described, such as the first socket member 610 and the second socket member 620 will not be described herein, and reference may be made to the detailed description described above.

Hereinafter, an automobile cable socket according to another embodiment of the present invention will be described in detail with reference to FIGS. 20 through 24.

Figure 20:
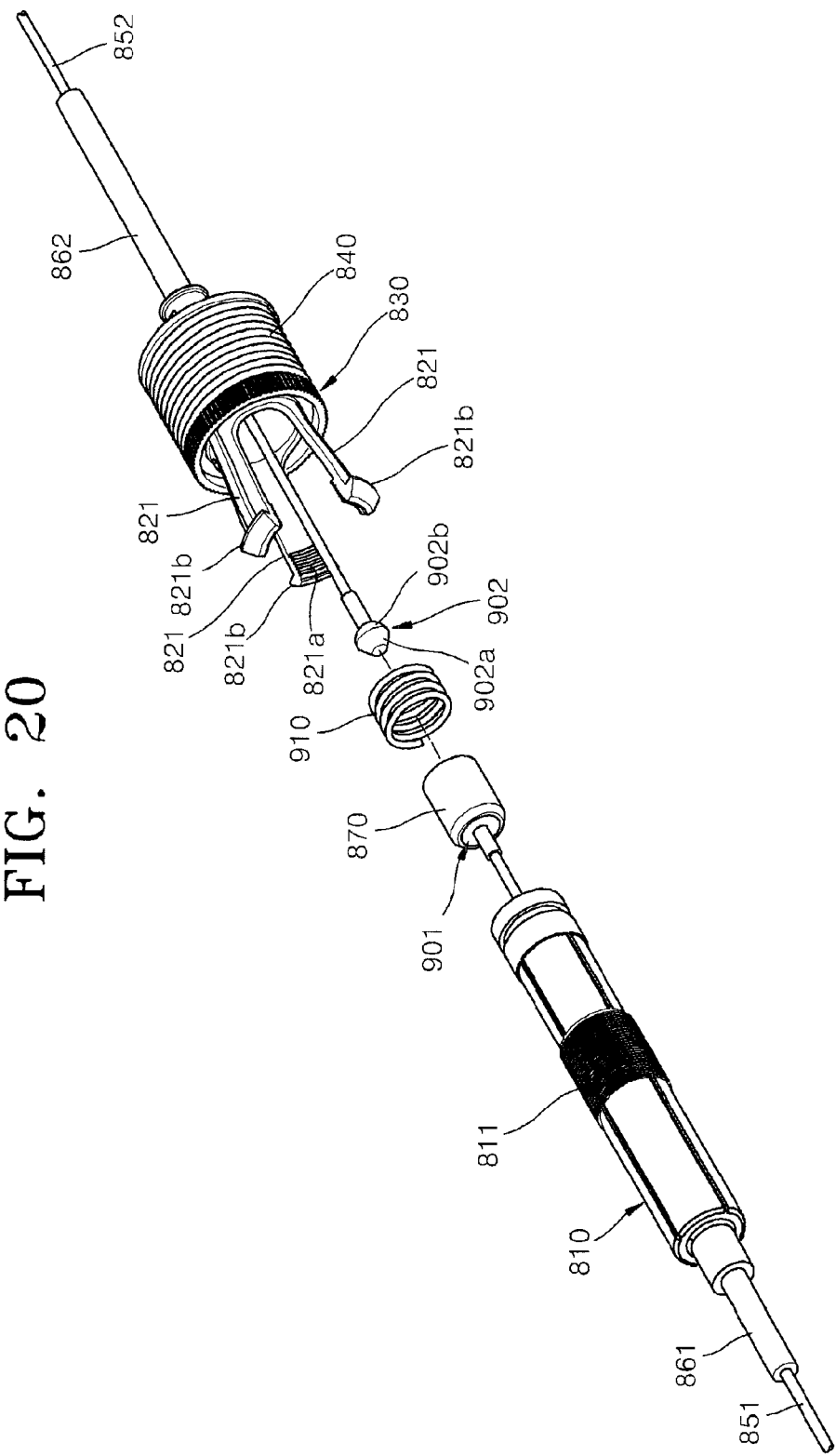
FIG. 20 is an exploded perspective view of an automobile cable socket according to another embodiment of the present invention.
Figure 21:
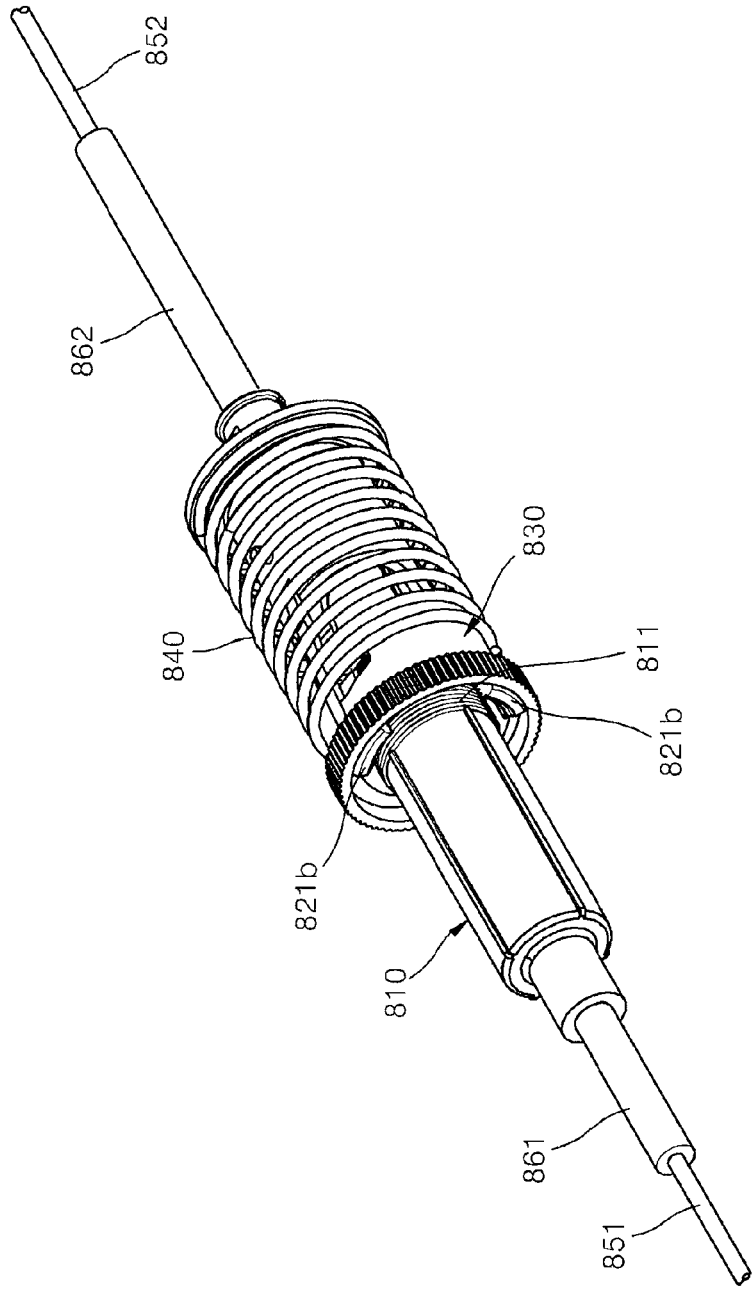
FIG. 21 is a perspective view of the automobile cable socket of FIG. 20 in a state in which the automobile cable socket is assembled.
Figure 22:
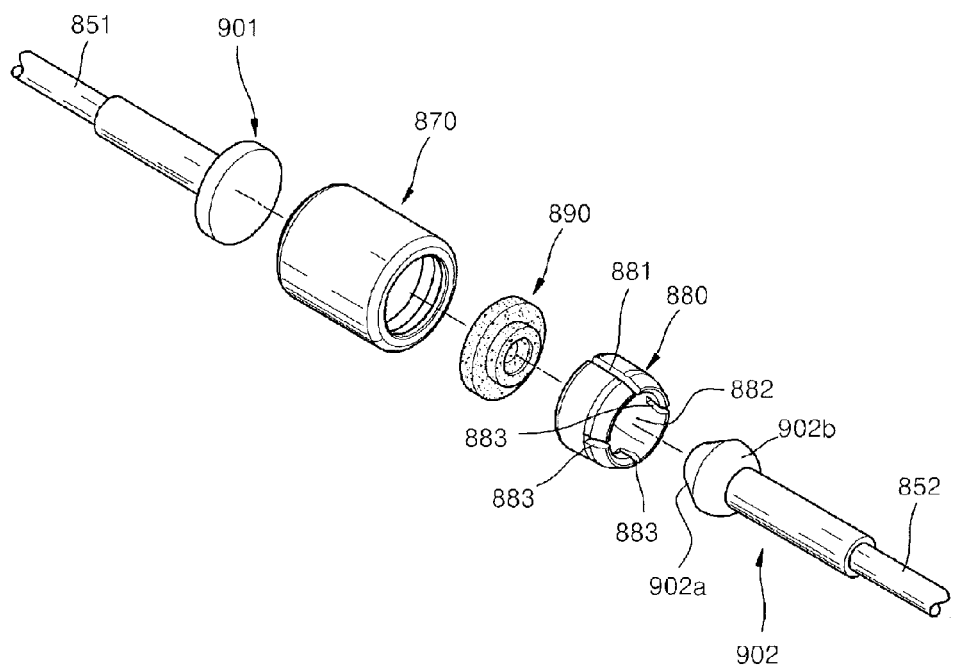
FIG. 22 is an exploded perspective view of a main portion of the automobile cable socket of FIG. 20.
Figure 23:
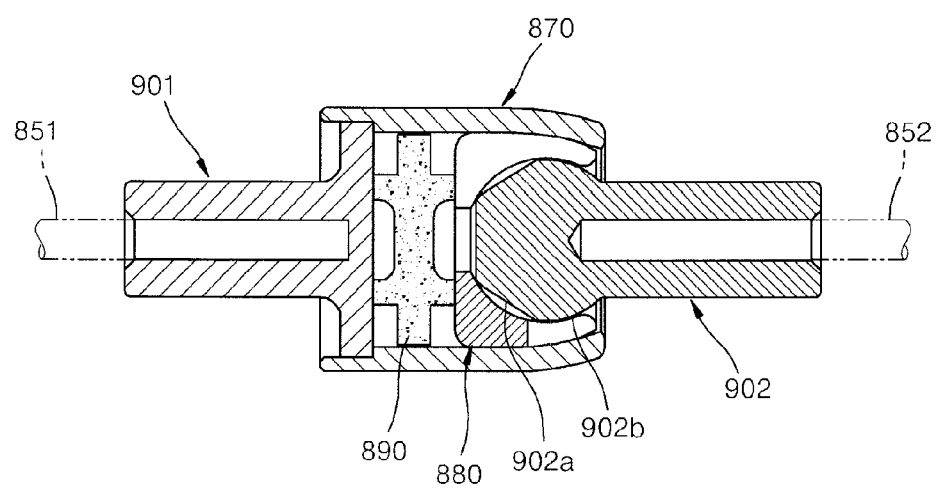
FIG. 23 is a cross-sectional view of a main portion of the automobile cable socket of FIG. 20.
Figure 24A:
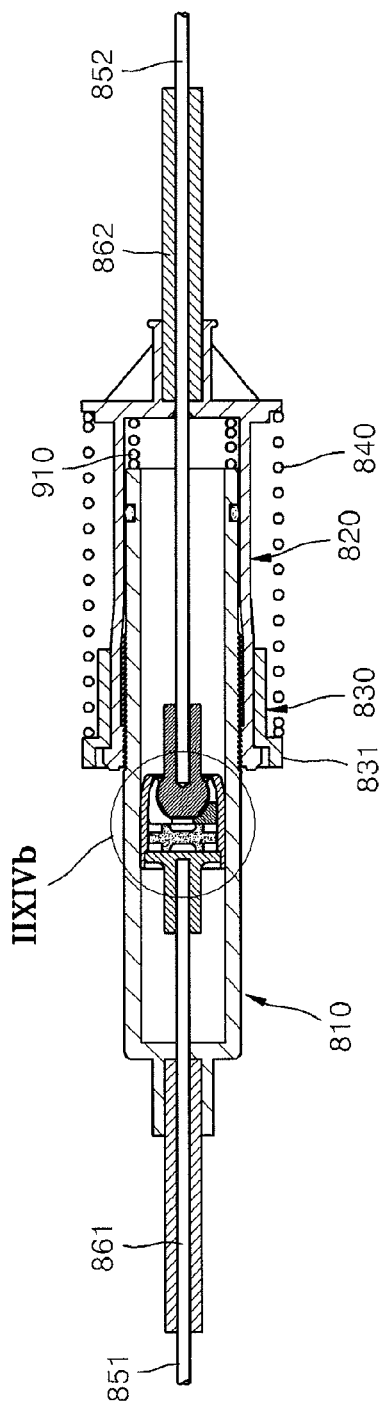
FIG. 24A is a cross-sectional view of the automobile cable socket of FIG. 20.
Figure 24B:
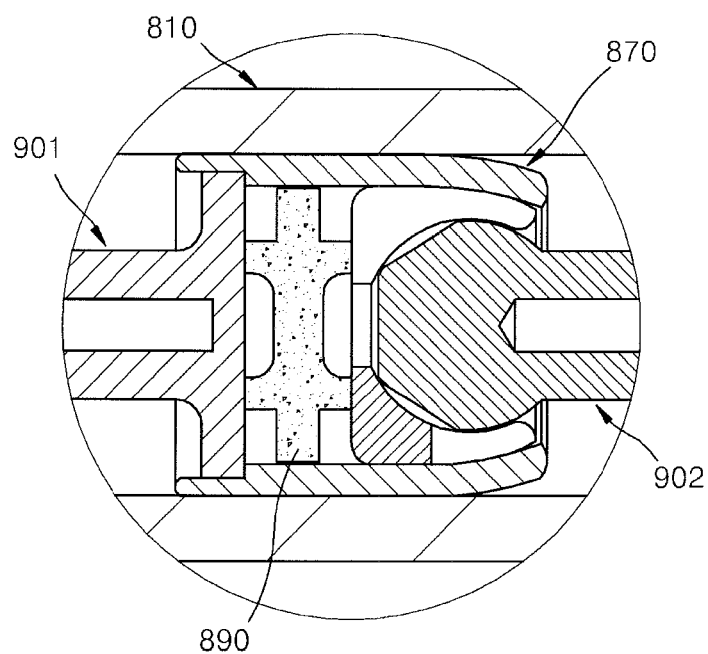
FIG. 24B is a cross-sectional view of a magnified portion of a portion IIXIVb of FIG. 24A.

FIG. 20 is an exploded perspective view of an automobile cable socket according to another embodiment of the present invention. FIG. 21 is a perspective view of the automobile cable socket of FIG. 20 in a state in which the automobile cable socket is assembled. FIG. 22 is an exploded perspective view of a main portion of the automobile cable socket of FIG. 20. FIG. 23 is a cross-sectional view of a main portion of the automobile cable socket of FIG. 20. FIG. 24A is a cross-sectional view of the automobile cable socket of FIG. 20. FIG. 24B is a cross-sectional view of a magnified portion of a portion IIXIVb of FIG. 24A.

Referring to FIGS. 20 through 24B, the automobile cable socket according to the present embodiment includes a coupling member 870 and a bush 880, which are used for connection using a pair of connection members (that is, a first connection member 901 and a second connection member 902).

As shown in FIG. 23, the coupling member 870 couples and seals ends of the first connection member 901 and the second connection member 902, which face each other, together with a vibration blocking member 890.

In this case, the first connection member 901 is connected to a first cable 851 of a pair of cables 851 and 852 for transferring power between automobile components. The second connection member 902 is connected to a second cable 852 facing the first cable 851 so as to face the first connection member 901.

According to the present embodiment, the vibration blocking member 890 is disposed between ends of the first connection member 901 and the second connection member 902. That is, the first connection member 901 and the second connection member 902 are disposed at opposite sides so that the vibration blocking member 890 is disposed between the first connection member 901 and the second connection member 902.

As shown in FIG. 22, the bush 880 includes a receiving space 882 for accommodating an end of the second connection member 902, facing the first connection member 901, a split slit 881 that is elastically deformable, and a plurality of wore portions 883 that are arranged in a radial direction together with the split slit 881.

The bush 880 including the wore portions 883 together with the split slit 881 is entirely deformed due to the split slit 881 and is partially deformed by deforming sections divided by the wore portions 883, thereby increasing efficiency for connection with the second connection member 902.

The second connection member 902 inserted into the receiving space 882 of the bush 880 includes a first tapered portion 902a in order to facilitate connection with the bush 880. The first tapered portion 902a is configured so that a front end thereof has a smallest external circumference and an external circumference is gradually increased towards a portion having a constant external circumference, and thus the second connection member 902 may be easily inserted into the receiving space 882 of the bush 880.

The automobile cable socket according to the present embodiment is configured so that an external circumference of a connection portion of the second connection member 902, to which the receiving space 882 of the bush 880 is connected, may be gradually increased away from a front end of the first tapered portion 902a, thereby increasing efficiency for connection with the second connection member 902 so as to attain mass-production.

According to the present embodiment, the first connection member 901 and the second connection member 902 may axially disposed, and the bush 880 and the second connection member 902 are axially moved and coupled to each other. Thus, the first and second cables 851 and 852 may be connected by coupling components having a relatively simple structure, thereby stably coupling components to each other.

The second connection member 902 may include a second tapered portion 902b together with the first tapered portion 902a. A portion with a constant external circumference is disposed between the second tapered portion 902b and the first tapered portion 902a. The second tapered portion 902b has an external circumference that is gradually reduced towards the portion with the constant external circumference from a portion of the first tapered portion 902a, which has a greatest external circumference. The second tapered portion 902b may increase an efficiency of separating the second connection member 902 and the bush 880 from each other.

According to one or more embodiments of the present invention, in an automobile cable socket, components for coupling a first socket member and a second socket member to each other may have a simple structure and may be easily formed. That is, since the first socket member, the second socket member, and a position fix member have shapes symmetrical with respect to a central axis, conventional asymmetrical components are not required. Thus, a mold for forming a product may be easily formed, thereby increasing productivity of the product and reducing manufacturing costs.

In addition, according to one or more embodiments of the present invention, in the automobile cable socket, a position fix member is pressed to move back a spring, and then a pressure applied to position fix member is released to couple the first socket member and the second socket member to each other. Thus, efficiencies of coupling and separating operations between the first socket member and the second socket member may be increased in reality. In addition, if it is required to separate the first socket member and the second socket member from each other after the first socket member and the second socket member are coupled to each other, the first socket member and the second socket member may be separated from each other without being damaged.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An automobile cable socket for connecting first and second cables for transferring power between automobile components to each other, and for fixing the first and second cables to an inner portion of a vehicle, the automobile cable socket comprising:
   a first socket member that is disposed to surround the first cable and comprises a plurality of sawtooth portions formed on an external surface thereof in a direction in which the first cable extends, wherein the first cable is moveably installed in the first socket member;
   a second socket member coupled to the first socket member and comprising an engaging portion, wherein the second cable is moveably installed in the second socket member, the engaging portion is elastically deformable and has a shape corresponding to the plurality of sawtooth portions so as to be engaged with the plurality of sawtooth portions;
   a spring installed around the second socket member; and
   a position fix member disposed between the second socket member and the spring, the position fix member releasing engagement between the engaging portion of the second socket member and the plurality of sawtooth portions of the first socket member by pressing the spring, the position fix member engaging the plurality of sawtooth portions with the engaging portion when the spring is restored to an original position.

2. The automobile cable socket of claim 1, further comprising a coupling member for coupling the first cable and the second cable to each other,
   wherein the coupling member comprises an inserting groove for inserting and coupling the first cable into the coupling member when the second cable is coupled to the coupling member.

3. The automobile cable socket of claim 1, further comprising a stopper included in the second socket member and a stumbling projection included in the position fix member, the stumbling projection stopped at the stopper, so as to fix a position of the position fix member to a position where the plurality of sawtooth portions are engaged with the engaging portion.

4. The automobile cable socket of claim 1, further comprising:
   a liner disposed between the first socket member and the first cable, wherein the first cable is moveably installed inside the liner;
   a cap member comprising a flange portion disposed between the liner and the first socket member, and an exposed portion extending from the flange portion, wherein the exposed portion is exposed to an outside through the first socket member when the cap member is coupled to the liner, and comprises an inserting groove formed in an external surface of the cap member; and
   a separation blocking member that is inserted into the inserting groove of the cap member so as to prevent positions of the liner and the cable from being changed with respect to the first socket member.

5. The automobile cable socket of claim 1, further comprising:
   a position fix boss formed on an outer circumference surface of the second socket member; and
   an inserting slit formed in the position fix member, wherein the position fix boss is inserted into the inserting slit,
   wherein, when the position fix member moves while pressing the spring, the position fix boss is inserted into the inserting slit so as to maintain an elastic deformation state of the engaging portion of the second socket member.

6. The automobile cable socket of claim 1, further comprising:
   a coupling member moveably installed in an internal space formed by coupling the first socket member and the second socket member in a longitudinal direction of the first cable;
   a bush capable of moving forwards or backwards from a first connection portion coupled to the first cable in the coupling member, the bush having an internal space capable of being extended or reduced, wherein a second connection member coupled to the second cable is disposed in the internal space of the bush; and
   a vibration blocking member that is disposed between the first connection member and the bush, and is elastically deformable in a longitudinal direction of the first cable in the coupling member in order to ensure the internal space of the bush.

7. The automobile cable socket of claim 6, wherein the second connection member has a spherical shape,
   wherein the bush has a slit so as to be elastically deformed and has an internal space having a spherical shape so as to accommodate the second connection member.

8. The automobile cable socket of claim 1, further comprising:
   a first connection member coupled to the first cable and comprising a coaxial maintenance boss that protrudes in a direction in which the first cable extends;
   a second connection member coupled to the second cable, disposed at an opposite side to the first connection member, and comprising a coaxial maintenance groove for coaxially accommodating the coaxial maintenance boss; and
   a coupling member for coupling and sealing ends of the first connection member and the second connection member, which face each other.

9. The automobile cable socket of claim 8, further comprising a vibration blocking member disposed between the first connection member and the second connection member, wherein the coaxial maintenance boss of the first connection member is disposed through the vibration blocking member.

10. The automobile cable socket of claim 8, further comprising a bush that is disposed in the coupling member, has a receiving space for accommodating an end of the second connection member, which faces the first connection member, and comprises a split slit for elastically deforming the bush,
    wherein the end of the second connection member, which faces the first connection member, is inserted into the receiving space of the bush so as to deform the bush, and
    wherein the second connection member comprises a tapered portion that has a front end having a greatest diameter and has a diameter increased towards a portion with a constant diameter from the front end.

11. The automobile cable socket of claim 8, wherein a separation blocking projection is formed on an inner circumference surface of the bush so as to stumble over a portion of the tapered portion of the second connection member, which has a greatest diameter.

12. The automobile cable socket of claim 8, wherein the bush comprises a plurality of wore portions that are arranged in a radial direction together with the split slit.

13. The automobile cable socket of claim 8, further comprising a bush that is disposed in the coupling member, has a receiving space for accommodating an end of the second connection member, which faces the first connection member, and is elastically deformable, wherein the end of the second connection member, which faces the first connection member, is inserted into the receiving space of the bush so as to deform the bush, and wherein the second connection member includes a first tapered portion in order to facilitate the inserting, wherein the first tapered portion is configured so that a front end has a smallest external circumference and an external circumference is gradually increased towards a portion having a constant external circumference.

14. The automobile cable socket of claim 13, wherein the second connection member further comprises a second tapered portion disposed between the first tapered portion and a portion with a constant external circumference, and wherein the second tapered portion has an external circumference that is gradually reduced towards the portion with constant external circumference from a portion of the first tapered portion, which has a greatest external circumference.

* * * * *